(12) United States Patent
Smith et al.

(10) Patent No.: US 7,192,052 B2
(45) Date of Patent: Mar. 20, 2007

(54) INFLATION ASSEMBLY WITH EXTENDED FILLING CAPABILITY

(75) Inventors: Bradley W. Smith, Ogden, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 336 days.

(21) Appl. No.: 10/669,884

(22) Filed: Sep. 24, 2003

(65) Prior Publication Data

US 2005/0062272 A1   Mar. 24, 2005

(51) Int. Cl.
*B60R 21/26* (2006.01)
(52) U.S. Cl. ........................ 280/737; 280/741
(58) Field of Classification Search .............. 280/737, 280/740, 741, 736, 742
See application file for complete search history.

(56) References Cited

U.S. PATENT DOCUMENTS

| | | | |
|---|---|---|---|
| 5,669,629 A | 9/1997 | Rink | |
| 5,788,270 A | 8/1998 | Håland et al. | |
| 5,884,938 A | 3/1999 | Rink et al. | |
| 5,941,562 A | 8/1999 | Rink et al. | |
| 6,145,876 A | 11/2000 | Hamilton | |
| 6,196,582 B1 | 3/2001 | Sparkman et al. | |
| 6,244,623 B1 * | 6/2001 | Moore et al. | 280/737 |
| 6,254,129 B1 | 7/2001 | Rink et al. | |
| 6,332,404 B1 * | 12/2001 | Rink et al. | 102/530 |
| 6,595,546 B2 | 7/2003 | Smith | |
| 6,601,872 B2 * | 8/2003 | Zimbrich et al. | 280/737 |
| 6,786,507 B2 * | 9/2004 | Dolling et al. | 280/737 |
| 6,908,105 B2 * | 6/2005 | Yamazaki et al. | 280/737 |

* cited by examiner

*Primary Examiner*—Eric Culbreth
(74) *Attorney, Agent, or Firm*—Sally J Brown; Pauley Petersen & Erickson

(57) ABSTRACT

Inflation assemblies, associated inflation assembly combinations and methods for inflating an inflatable restraint device and which assemblies, combination and methods employ a gas treatment element to effectively treat gas being discharged into an associated inflatable restraint device from either of at least two chambers, e.g., a hot gas-producing chamber and a cold gas-supplying chamber, such that heat is effectively conveyed to the cold gas such as to result in the desirable expansion thereof and the dissipation of residual heat from the gas treatment element.

30 Claims, 5 Drawing Sheets

INFLATION ASSEMBLY WITH EXTENDED FILLING CAPABILITY

BACKGROUND OF THE INVENTION

This invention relates generally to the providing or supplying of inflation gas and, more particularly, to the providing or supplying of such inflation gas via an inflation assembly with extended filling capability such as may be desired for certain inflatable passive restraint systems for use in vehicles for restraining the movement of an occupant in the event of a vehicular collision.

It is well known to protect a vehicle occupant by means of safety restraint systems, i.e., "passive restraint systems", which self-actuate from an undeployed to a deployed state without the need for intervention by the operator. Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid having the occupant forcibly strike such parts of the vehicle interior.

Various types or forms of such passive restraint assemblies have been developed or tailored to provide desired vehicle occupant protection such as based on either or both the position or placement of the occupant within the vehicle and the direction or nature of the vehicle collision, for example. In particular, driver side and passenger side inflatable restraint installations have found wide usage for providing protection to drivers and front seat passengers, respectively, in the event of head-on types of vehicular collisions. Driver side and passenger side inflatable restraint installations do not, however, generally provide as great as may be desired protection against vehicular impacts inflicted or imposed from directions other than head-on, i.e., "side impacts." In view thereof, substantial efforts have been directed to developing inflatable restraint installations having particular effectiveness in the event of a side impact.

Upon deployment, the time period during which an airbag cushion remains pressurized is commonly referred to as "stand-up time." In practice, driver side and passenger side airbag cushions are typically desirably designed to begin deflating almost instantaneously upon deployment such as to avoid presenting an undesirably hard or ungiving surface to an oppositely situated vehicle occupant. However, airbag cushions that provide substantially longer stand-up times may be required or desired in the event of certain accidents or collisions in order to provide a suitable desired level of occupant protection. For example, one particularly troublesome form of side impact is commonly referred to as a "roll-over." In a roll-over incident, a vehicle may undergo a partial, complete or multiple roll-over. As will be appreciated by those skilled in the art, roll-over accidents can be particularly demanding on inflatable restraint systems. In particular, an airbag cushion designed to provide occupant protection in the event of a vehicle roll-over may be required or desired to remain pressurized for an extended or prolonged period of time, as compared to usual or typical driver side and passenger side airbag installations. For example, a roll-over protection side impact airbag cushion desirably remains pressurized or provides a stand-up time as long as about 5 seconds.

One particularly effective form of side impact inflatable restraint is the subject of HÅland et al., U.S. Pat. No. 5,788,270, issued 4 Aug. 1998, the disclosure of which patent is hereby incorporated by reference herein in its entirety and made a part hereof. Inflatable elements, such as disclosed in HÅland et al., U.S. Pat. No. 5,788,270, may desirably include an inflatable portion formed from two layers of fabric with the front layer and the back layer of the fabric woven together at selected points. In particular embodiments, such selected points are arranged in vertically extending columns and serve to divide the inflatable part into a plurality of vertical parallel chambers. The spaces between the selected points permit internal venting between adjacent chambers of the inflatable element. Particular such inflatable devices/elements, such as utilized in applications to provide protection over an extended area and having a generally planar form, are frequently referred to as "inflatable curtains."

A one piece woven construction has been found to be a particularly effective method of forming such inflatable element airbag cushions. In particular, one piece woven constructions have been found to provide a relatively low cost method of constructing suitable such airbag cushions which provide desired stand-up times. While inflatable element airbag cushions can, as is known in the art, be fabricated of various materials, nylon 6,6 has been found to be a particularly effective and useful material for use in the making or manufacture of inflatable curtain elements such as described above and having a one piece woven design.

In addition to an airbag cushion, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Many types or forms of inflator devices have been disclosed in the art for use in inflating an inflatable restraint system airbag cushion.

One common type or form of inflator device utilizes or relies on a stored compressed gas. Upon actuation, such devices release the stored gas into an associated airbag cushion to effect the inflation thereof. Such inflator devices are sometimes referred to as cold gas inflators as in such inflators the gas typically undergoes either no heating or only minor, insignificant heating, e.g., heating which is less than the cooling that occurs due to expansion as the gas is released from the inflator.

In the past, rollover applications typically have required the use of such cold gas inflators. In particular, the gas discharged or provided by such inflator devices typically expands and warms upon release, such that the cold gas inflator is able to maintain pressure in a sealed airbag for relatively long periods of time. Unfortunately, cold gas inflators typically are much larger and heavier than desired.

Another common form or type of inflator device used in inflatable passive restraint systems is commonly referred to as a pyrotechnic inflator. While various combustible pyrotechnic materials are available, such inflator devices typically produce or result in a relatively high temperature product gas, derived from the combustion of a pyrotechnic gas generating material. In practice and such as due to the effects of heat, such pyrotechnic or hot gas-providing inflators can typically be made smaller and lighter and use fewer moles of gas as compared to a cold gas inflator in order to provide the same volume of gas.

In addition, the gas generated by the combustion of such pyrotechnic materials may contain variously sized particulate material. Thus, it is relatively common to include within such inflator devices a filter or other selected gas treatment component or element such as effective to perform various functions or treatments, such as, provide for one or more of cooling, flow redirection and filtering (e.g., particulate removal) of or by a contacting stream, such as generated gas, for example. Nevertheless, gas discharge temperatures in the range of about 1300 K are common for conventional pyrotechnic inflator devices.

However, pyrotechnic or other forms of hot gas-providing inflators normally do not generally provide or result in extended stand-up times of associated inflatable elements, such as required or desired for particular restraint installations, as described above. More particularly, as the hot (e.g., elevated temperature) gas produced or provided by such inflator devices rapidly cools, the pressure within the associated airbag cushion rapidly diminishes such that the stand-up time of such associated airbag cushion is limited or reduced.

Moreover, it is common to include within an associated airbag cushion a heat resistant coating or one or more strategically placed patches of heat resistant material such as to minimize or avoid direct contact of the hot inflator discharge onto unprotected airbag cushion material. Unfortunately, the inclusion of a heat resistant coating or patches of heat resistant material within such inflatable cushion elements is not always practical. For example, such inclusion almost invariably results in the side impact cushion, when folded such as in a stored condition, being more bulky than is generally desired.

In addition, the gas treatment component or element of such pyrotechnic, hot gas-providing inflators may retain significant amounts of heat. Consequently, care must be taken that such heat not undesirably "soak out" over time in a manner such as may damage objects in contact or proximity therewith.

As will be appreciated, inflatable curtain restraint devices can be particularly demanding of an associated inflation assembly. For example, inflatable curtain restraint devices are typically required to be deployed in position in less than 20 milliseconds and have an inflatable curtain internal pressure of greater than about 50 to 80 kilopascals at 30 milliseconds following actuation.

In view of the above, there is a need and a demand for inflation assemblies particularly suited for inflation of restraint devices, such as rollover inflatable curtains.

Further, there is a need and a demand for such inflation assemblies that are smaller and lighter in weight than cold gas inflators. In particular, there is a need and a demand for a smaller, lighter inflator that can fill a rollover curtain inflatable element using heated gas, yet maintain an extended stand-up time for such a rollover curtain inflatable element.

Still further, there is a need and a demand for such an inflation assembly that minimizes, reduces or eliminates issues relating to heat "soak out".

SUMMARY OF THE INVENTION

A general object of the invention is to provide one or more of improved inflation assemblies, associated inflation assembly combinations and methods for inflating an inflatable restraint device.

A more specific objective of the invention is to overcome one or more of the problems described above.

The general object of the invention can be attained, at least in part, through a specified inflation assembly effective for supplying a quantity of inflation gas to at least one associated inflatable restraint device. In accordance with one preferred embodiment of the invention such an inflation assembly includes a first chamber that contains a supply of a first reactant material effective, upon reaction, to produce first reaction products at least including a quantity of gas and a quantity of heat. The inflation assembly also includes a first initiator in reaction initiating discharge communication with at least a portion of the supply of the first reactant material contained within the first chamber. The first initiator is effective upon actuation to initiate reaction of at least a portion of the supply of the first reactant material contained within the first chamber. The inflation assembly further includes a diffuser chamber having a first end and a second end. The diffuser chamber is in gas flow communication through the first end with the first chamber upon actuation of the first initiator. The diffuser chamber is effective to discharge gas into the at least one associated inflatable restraint device. The inflation assembly also includes at least one gas treatment element at least in part disposed within the diffuser chamber. The at least one gas treatment element is effective for treating gas being discharged into the at least one associated inflatable restraint device. The inflation assembly still further includes a second chamber having contents including a supply of at least one gas source material. The second chamber is closed in a static state with the supply of the at least one gas source material compressed therewithin. The second chamber is openable upon actuation thereof whereby at least a portion of the second chamber contents are in gas flow communication through the second end with the diffuser chamber and the at least one gas treatment element disposed therewithin.

In accordance with one preferred embodiment of such an inflation assembly, the first chamber produces or generates a hot gas. Such hot gas is passed into the diffuser chamber wherein the hot gas contacts and is treated, e.g., cooled, by the treatment element and with the treatment element itself undergoing heating. Subsequently, with the opening of the second chamber and the release of the contents thereof, at least a portion of the second chamber contents are in gas flow communication through the second end with the diffuser chamber and the heated gas treatment element disposed therewithin such as resulting in the heating of such contents. As will be appreciated and as described in greater detail below, such an assembly desirably provides or results in an extended stand-up time as the initially provided supply of inflation gas is followed by a supplemental supply of inflation gas. Further, the release of contents from the second chamber can serve to desirably employ or utilize residual heat present in or with the treatment element such as to heat and further expand the contents, e.g., gas, contacting therewith while simultaneously minimizing, reducing or eliminating issues relating to heat soak.

The prior art has generally failed to provide as effective or efficient as desired inflation assemblies particularly suited to provide or result in an extended stand-up time of an associated airbag cushion, as required or desired for certain inflatable restraint installations. In particular, the prior art generally fails to provide inflator devices for such applications which are desirably smaller and lighter in weight than cold gas inflators which provide the same volume of gas. Thus, the prior art generally fails to provide inflator devices which are pyrotechnic-based or have principles of operation based on pyrotechnic inflators which are well suited for use in association with side impact inflatable restraints, such as inflatable curtain type occupant restraints. That is, the prior art generally fails to provide pyrotechnic-based inflator devices which provide or result in an extended stand-up time of an associated inflatable device in a manner which is as efficient and effective as may otherwise be desired. Moreover, the prior art generally fails to provide such a pyrotechnic-based inflation assembly effective for supplying a quantity of inflation gas to at least one associated inflatable restraint device in a manner effective to minimize, reduce or eliminate issues relating to heat soak to as great an extent as may otherwise be desired.

An inflation assembly effective for supplying a quantity of inflation gas to at least one associated inflatable restraint device, in accordance with another preferred embodiment of the invention, includes a first chamber containing a supply of at least one pyrotechnic gas generant material effective, upon reaction, to produce first reaction products at least including a quantity of gas and a quantity of heat. The inflation assembly also includes a first initiator in reaction initiating discharge communication with at least a portion of the supply of the at least one pyrotechnic gas generant material contained within the first chamber. The first initiator is effective upon actuation to initiate reaction of at least a portion of the supply of the at least one pyrotechnic gas generant material contained within the first chamber. The inflation further includes a diffuser chamber effective to discharge gas into the at least one associated inflatable restraint device. The diffuser chamber has a first end and a second end and is in gas flow communication through the first end with the first chamber upon actuation of the first initiator. The inflation assembly still further includes at least one gas treatment element at least in part disposed within the diffuser chamber. The at least one gas treatment element is effective for treating gas being discharged into the at least one associated inflatable restraint device. The inflation assembly also further includes a second chamber having at least one opening closed in a static state by means of at least one seal and having contents including a supply of at least one compressed gas. The inflation assembly yet also further includes a chamber opener effective upon actuation of the inflation assembly to open the second chamber and to release at least a portion of the gas source material into gas flow communication through the second end with the diffuser chamber and the at least one gas treatment element disposed therewithin.

The invention still further comprehends an assembly for supplying inflation gas to an inflatable restraint device. In accordance with a preferred embodiment, the assembly includes a diffuser chamber having at least one discharge opening effective to discharge gas into the inflatable restraint device. The diffuser chamber has first and second ends with a pyrotechnic inflator device disposed at the first end and a stored gas chamber disposed at the second end. The pyrotechnic inflator device includes a first chamber containing supply of at least one pyrotechnic gas generant material effective, upon reaction, to produce first reaction products at least including a quantity of gas and a quantity of heat. The pyrotechnic inflator device also includes an initiator in reaction initiating discharge communication with at least a portion of the supply of the at least one pyrotechnic gas generant material contained within the first chamber. The first initiator is effective upon actuation to initiate reaction of at least a portion of the supply of the at least one pyrotechnic gas generant material contained within the first chamber. The stored gas chamber, in a static state, has contents including a supply of at least one stored compressed gas. The assembly also includes at least one gas treatment element at least in part disposed within the diffuser chamber and effective for treating gas being discharged into the inflatable restraint device. The assembly further includes a chamber opener at least in part disposed between the at least one gas treatment element and the stored gas chamber. The chamber opener is effective upon actuation of the inflation assembly to open the second chamber and to release at least a portion of the stored gas chamber contents into gas flow communication with the diffuser chamber and the at least one gas treatment element disposed therewithin.

Other objects and advantages will be apparent to those skilled in the art from the following detailed description taken in conjunction with the appended claims and drawings.

In an effort to simplify the drawings and facilitate understanding of the invention, various of these figures of inflation assemblies in accordance with the invention may have been simplified by not showing various customary or common inflation assembly components such as seals and the like which are not necessary for obtaining an understanding of the present invention.

DETAILED DESCRIPTION OF THE INVENTION

The present invention provides improved inflation assemblies, associated inflation assembly combinations and methods such as may be used for the inflation an inflatable device such as in the form of an inflatable vehicle occupant restraint, for example. More particularly, the invention provides inflation devices, assemblies and methods of inflatable device inflation such as may supply or furnish inflation gas in a manner such as may provide or result in an extended stand-up time for an associated inflatable device. As is described in more detail below, the invention desirably incorporates and employs a gas treatment element to effectively treat gas being discharged into an associated inflatable restraint device from either of at least two chambers, e.g., a hot gas-producing chamber and a cold gas-supplying chamber, such that heat is effectively conveyed to the cold gas such as to result in the desirable expansion thereof and the dissipation of residual heat from or by the gas treatment element.

Figure 1:
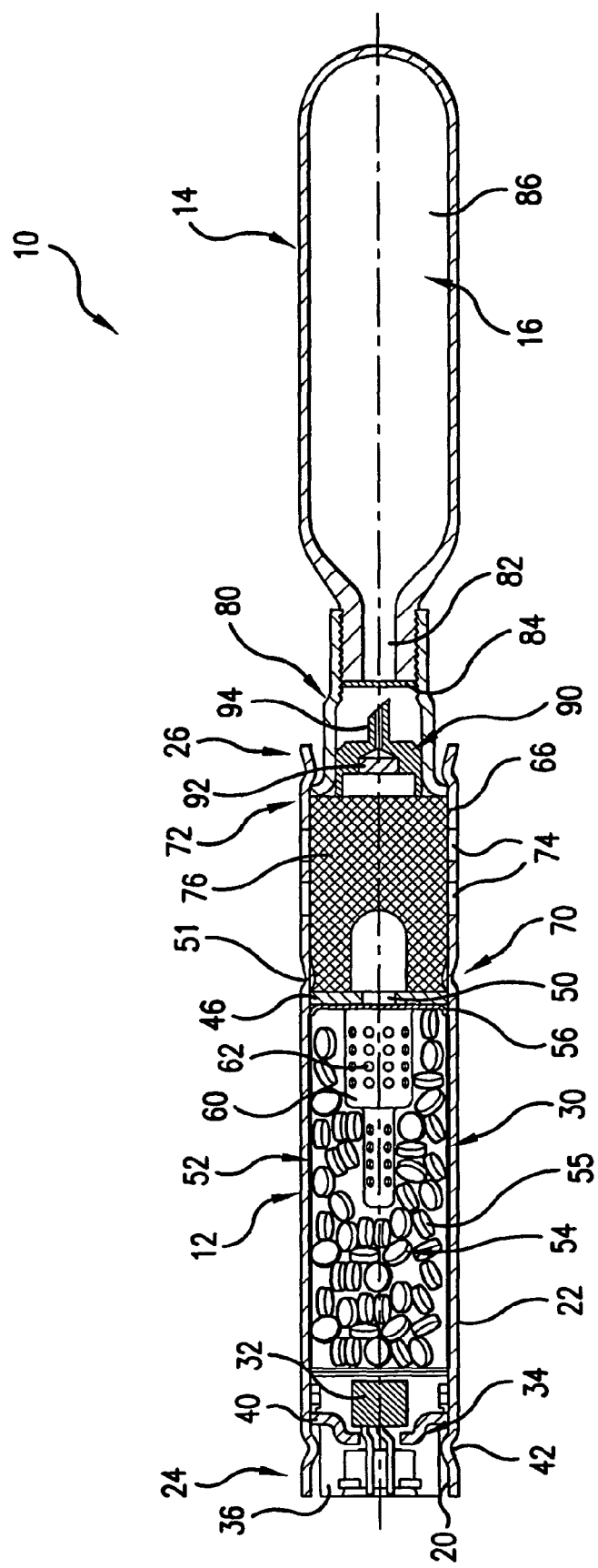
FIG. 1 is a simplified side view, partially in section, of an inflation assembly in accordance with one preferred embodiment of the invention.

As will be appreciated, the present invention may be embodied in a variety of different structures. As representative, FIG. 1 illustrates the present invention as embodied in an inflation assembly, generally designated by the reference numeral 10. While such inflation assemblies can desirably find various uses, the invention is believed to have particular utility for supplying gas such as may be used in the inflation of an inflatable vehicle occupant restraint, e.g., an inflatable airbag cushion, particularly, inflatable curtain type inflatable vehicle occupant restraints, such as identified above and as will be described in greater detail below.

The inflation assembly 10 is shown in a static state and generally includes an elongated hollow tubular member 12 to which is joined or connected a gas bottle 14 or the like such as forming a supplemental gas supply chamber 16. The tubular member 12 has an inner and an outer surface, 20 and 22, respectively, and forms generally opposed first and second ends, 24 and 26, respectively. The tubular member 12, at least in part, forms or includes a chamber or inflator device 30, sometimes hereinafter referred to as a "first chamber" or a "hot gas-producing chamber". The tubular member 12 also houses or contains an initiator 32, such as known in the art and actuatable to effect ignition of a supply of gas generant material as later herein described.

As shown, the initiator 32 may form a part of an initiator assembly 34 that also includes an adapter 36 and a base plate 40. The initiator 32, such as as a part of the initiator assembly 34, may be suitably secured at a desired location within the tubular member 12, such as by means of a first orbital crimp 42 imposed in or on the tubular member 12 near or at the first end 24.

The tubular member 12 also houses or contains an orifice plate 46 and such as having an orifice 50 passing therethrough. The orifice plate 46 is suitably secured at a desired location within the tubular member 12, such as by means of a similar second orbital crimp 51 imposed in or on the tubular member 12.

The initiator assembly 34 and the orifice plate 46 are spaced apart to form a storage volume 52 therebetween and in which storage volume is contained a supply of pyrotechnic gas generant material, generally designated by the reference numeral 54, reactable to produce a supply of gas such as may be used in the inflation of an associated inflatable device (not here shown).

In FIG. 1, the supply of the pyrotechnic material 54 is in the form of tablets and is contained within a gas generant canister 56, such as formed of a metal foil or the like and such as known in the art, disposed within the first chamber 30. Those skilled in the art will, however, appreciate that pyrotechnic materials in other forms such as wafers, extrudlets or the like, for example, can be used in the practice of the invention. Thus, it will be appreciated that the broader practice of the invention is not necessarily limited by the specific form of gas generant pyrotechnic material employed therein. Further, while the invention has been described relative to an embodiment that incorporates a canister to contain the supply of the gas generant material in a static state, the broader practice of the invention is not necessarily so limited as, for example, the invention can, if desired, be practiced without the incorporation and use of such a gas generant canister or the like.

The storage volume 52 and, more specifically, the gas generant canister 56 therein contained, also contains or includes a strainer 60, such as of a design known in the art and such as may include or form a plurality of gas passage holes or openings 62. The strainer 60 may desirably serve to permit passage of gaseous products formed upon reaction of the gas generant material 36 while preventing passage therethrough of larger sized gas generant material remnants that may form during or may remain after reaction of the gas generant material, e.g., straining such remnants from the gas formed within the chamber 30. As will be appreciated, such a strainer, if included, can be variously formed or constructed such as may be desired or required for a particular installation.

The inflation assembly 10 also includes a diffuser chamber 66. The diffuser chamber 66 has a first end 70 and a second end 72. Upon actuation of the initiator 32, the diffuser chamber 66 is in gas flow communication with the first chamber 30 through the orifice 50 and the first end 70. In the illustrated embodiment, the diffuser chamber 66 is shown as being formed in or as part of the tubular member 12. It is to be appreciated, however, that the broader practice of the invention is not necessarily so limited. For example, if desired, the invention can be practiced using an inflation assembly having a diffuser chamber formed in or by a separate component such as joined or connected to a gas generant-containing first chamber.

The diffuser chamber 66 forms or includes exit openings, such as the exit openings 74, formed in or through the tubular member 12, and such as at least in part effective to discharge gas into an associated inflatable restraint device (not shown in FIG. 1). The diffuser chamber 66 includes or generally contains a gas treatment element 76. As described in greater detail below and in general accordance with the invention, desirable gas treatment of a contacting stream typically involves one or more of: cooling, redirection of flow, and removal or filtering of particulate from such contacting stream. In accordance with one preferred embodiment of the invention, the gas treatment element 76 is generally composed of a pack of woven metal. Those skilled in the art and guided by the teaching herein provided will, however, appreciate that other forms of gas treatment elements can, if desired, be used and that the broader practice of the invention is not necessarily limited to specific or particular forms or types of gas treatment elements.

As identified above, the inflation assembly 10 also includes a supplemental gas supply chamber 16. Such a supplemental gas supply chamber is sometimes hereinafter referred to as a "second chamber" or a "cold gas-supplying chamber". While such supplemental gas supply chamber can be variously formed or constructed, in the illustrated embodiment the supplemental gas supply chamber 16 is generally formed by the closed-end gas storage bottle 14. The gas storage bottle 14 is joined or otherwise desirably connected with the tubular member second end 26 via a connector 80 having a generally tubular construction or form. The gas storage bottle 14 has a necked-down opening 82 for permitting passage in and out of the supplemental gas supply chamber 16. In a static state, the supplemental gas supply chamber 16 is closed such as by means of a burst disc 84 disposed at or adjacent necked-down bottle opening 82. In such static state, the supplemental gas supply chamber 16 has contents, designated by the reference numeral 86, including a supply of at least one gas source material compressed therewithin. As will be appreciated by those skilled in the art and guided by the teachings herein provided, various gas source materials such as known in the art can be used in the practice of the invention. For example, suitable gas source materials for use in the practice of the invention include various gases or liquified gases which are inert or are generally unreactive under the conditions of operation. Examples of such gas source materials include but are not necessarily limited to argon, helium, carbon dioxide and mixtures thereof.

In accordance with certain preferred embodiments, it is desirable to incorporate or employ a dissociative gas source material. Suitable such gas source materials for use in the practice of the invention include various dissociative gas source materials such as disclosed in commonly assigned Rink, U.S. Pat. No. 5,669,629, issued 23 Sep. 1997; Rink et al., U.S. Pat. No. 5,884,938, issued 23 Mar. 1999; and Rink et al., U.S. Pat. No. 5,941,562, issued 24 Aug. 1999, the disclosures of which patents are expressly incorporated herein in their entirety. As disclosed in Rink, U.S. Pat. No. 5,669,629, a wide variety of gas source materials which undergo dissociative or decompositional reactions, preferably an exothermic such reaction, to form gaseous products are available. Such gas source materials include nitrous oxide ($N_2O$) and mixtures of nitrous oxide with one or more inert gas(es), for example.

Generally, dissociative gas source materials used in the practice of the invention are preferably:

a.) non-toxic and non-corrosive both in the pre- and post-dissociation states;

b.) relatively stable at atmospheric conditions thus permitting and facilitating storage in a liquid phase, where a liquid, as compared to a gas, permits the storage of a greater amount of material in the same volume at a given pressure;

c.) do not require the presence of catalyst(s) to trigger the dissociation reaction, and which catalysts may be difficult to remove or handle; and d.) form products of dissociation which do not contain undesirable levels of undesirable species, such as carbonaceous material (e.g., soot), $CO_x$, $NO_x$, $NH_3$, for example.

A currently preferred dissociative gas source material for use in the practice of the invention is nitrous oxide ($N_2O$). Nitrous oxide is advantageously generally non-toxic and non-corrosive. Further, nitrous oxide, as compared to gases such as air, nitrogen and argon, liquefies relatively easily at ambient temperatures. Additionally, nitrous oxide is relatively inert up to temperatures of about 200° C. or more. As a result, nitrous oxide is desirably relatively safe to handle, thermally stable, facilitates storage, and alleviates manufacturing concerns. Further, in accordance with the chemical reaction (1) identified below, nitrous oxide advantageously dissociates to form an increased molar content of gaseous products, with the dissociation products produced or formed upon the dissociation of nitrous oxide ideally being nitrogen and oxygen:

$$2N_2O = 2N_2 + O_2 \qquad (1)$$

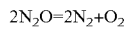

Thus, not only does such reaction form products which are generally non-toxic and non-corrosive but also results in the production or formation of reaction products in a molar content greater than the molar content of the reactant.

It is to be understood that such nitrous oxide can be stored in a gaseous, liquid or multi-phase form (i.e., partially gaseous and partially liquid mixture), as may be desired in particular applications or installations. In view of the above-identified general preference for smaller sized airbag inflators and the fact that the density of nitrous oxide is significantly greater when in a liquid, rather than gaseous form, one preferred embodiment of the invention involves storage of nitrous oxide primarily in a liquid form.

It is also to be understood that while such nitrous oxide dissociative gas source material can be contained within the supplemental gas supply chamber 16, in a pure form (e.g., such that the chamber contents include no more than minor levels of other materials, such as air as may be present in the dissociative chamber prior to being filled with the dissociative gas source material), it is currently preferred to include one or more inert gas(es) with such dissociative gas source material. For example, an inert gas such as helium can be included with nitrous oxide to facilitate leak checking of the inflator apparatus or, more specifically, of the supplemental gas supply chamber thereof. Alternatively or in addition, an inert gas, such as argon and helium, for example, as well as materials such as nitrogen and carbon dioxide which are essentially inert under such processing conditions or various combinations thereof can be included such as to supplement the gas produced or formed upon the dissociation of the nitrous oxide.

Fluid chamber contents composed of about 30 mole percent nitrous oxide, about 60 mole percent argon and about 10 mole percent helium is one specific example of a gas source material combination for use in the practice of the invention.

The second chamber 16 is closed in a static state with the supply of the at least one gas source material compressed therewithin.

The inflation assembly 10 includes a chamber opener assembly 90 such as disposed within the tubular connector 80 and actuatable to effect opening of the supplemental gas supply chamber 16 such that at least a portion of the supplemental gas supply chamber contents 86 are in gas flow communication through the bottle opening 82 and the tubular member second end 26 with the diffuser chamber 66 and the at least one gas treatment element 76 disposed therewithin. More specifically, the chamber opener assembly 90 of the illustrated embodiment, includes a plug 92 and a needle 94. Upon actuation of the chamber opener assembly 90, the needle 94 is effective to rupture or otherwise open the burst disc 84 such as to permit passage of at least a portion of the supplemental gas supply chamber contents 86 through the bottle opening 82 and out from the supplemental gas supply chamber 16.

In operation, such as upon the sensing of a collision, an electrical signal is sent to the inflation assembly 10 and, in the illustrated embodiment, more specifically to the initiator assembly 34 and the initiator 32 thereof. The initiator assembly 34 functions such as to rupture or otherwise open the gas generant canister 56 to initiate reaction of at least a portion of the supply of the gas generant pyrotechnic material 54 and the formation of reaction products including relatively hot gaseous reaction products. The gaseous reaction products pass through the openings 62 in the strainer 60 and eventually out of the hot gas-producing chamber 30 and into the diffuser chamber 66. In the diffuser chamber 66, the hot gaseous reaction products contact the gas treatment element 76 and are appropriately treated thereby. The treated gas is then passed through the exit openings 74 and into communication with the associated inflatable restraint device such as to effect the inflation or deployment thereof.

In accordance with a preferred practice of the invention, an inflation assembly in accordance with the invention is desirably effective to deploy an inflatable curtain restraint device into position within the interior of the particular vehicle in less than 20 milliseconds and with an inflatable curtain internal pressure of greater than about 50 to 80 kilopascals at a point in time of 30 milliseconds following actuation.

The increase in pressure within the diffuser chamber 66 resulting from the passage therein of the hot gaseous reaction products serves to drive the needle 94 to rupture or otherwise open the burst disc 84 such as to permit passage of at least a portion of the supplemental gas supply chamber contents 86 through the bottle opening 82 and out from the supplemental gas supply chamber 16. The flow of gas from the supplemental gas supply chamber 16, through the small throttling orifice formed thereto, bleeds down the supplemental gas supply chamber contents 86 over an extended time interval, such as typically ranging from about 3 to 5 seconds. Such released supplemental gas supply chamber contents subsequently are in gas flow communication through the diffuser chamber second end 72 with the diffuser chamber 66 and the gas treatment element 76 disposed therewithin. As a result, residual heat present in the gas treatment element 76 from the earlier contact with the hot gaseous reaction products formed by or upon reaction of at least a portion of the supply of the gas generant pyrotechnic material 54 can desirably be employed or utilized to further heat and expand the released supplemental gas supply chamber contents.

As identified above, in accordance with certain preferred embodiments, it is desirable to incorporate or employ a dissociative gas source material such as nitrous oxide as a gas source material contained within the supplemental gas supply chamber 16. Those skilled in the art and guided by the teachings herein provided will understand and appreciate that the further heating of such a dissociative gas source material, due to contact or communication with the heated gas treatment element 76 can desirably provide additional gas volume to desirably sustain the fill of the associate inflatable restraint device. As a result, the overall efficiency of the inflator assembly can desirably be enhanced. In addition, complications due to or arising from the potential for heat soak and the need to compensate for such potential can desirably be reduced, minimized or eliminated.

Inflation assemblies in accordance with certain preferred embodiments of the invention desirably include or contain a gas treatment element effective to provide sufficient cooling to the contacting hot gas such as to prevent or avoid subsequent damage to the inflatable airbag cushion fabric or material of construction when contacted by such treated gas, such as during the initial airbag cushion filling phase. Further, inflation assemblies in accordance with certain preferred embodiments of the invention desirably include or contain a sufficient supplemental gas supply to provide a desired airbag cushion stand-up pressure (e.g., an airbag cushion stand-up pressure of greater than 20 to 25 kilopascals at 5 seconds).

Figure 2:
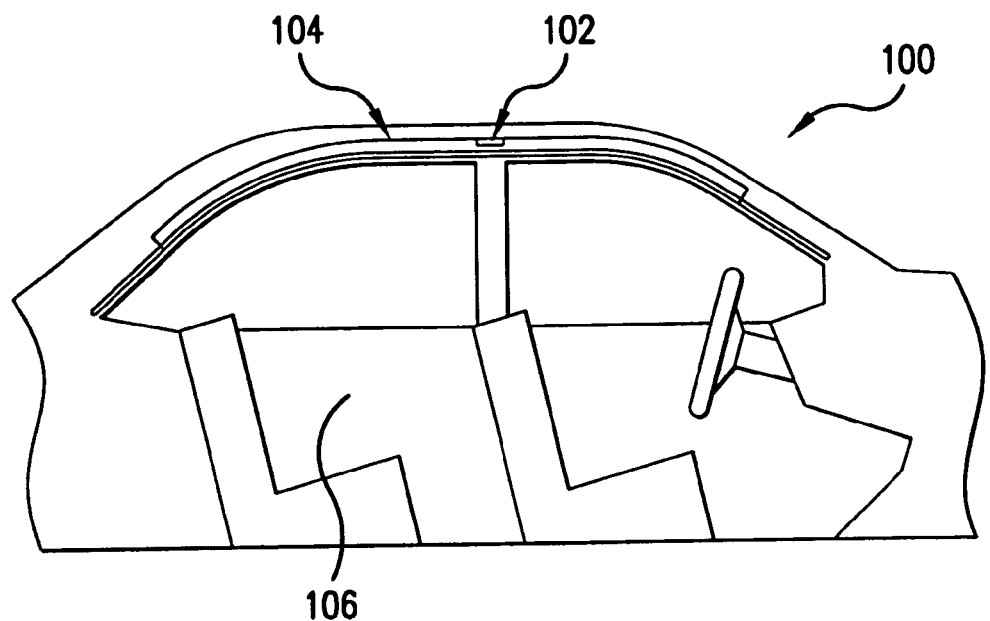
FIG. 2 is a simplified fragmentary schematic of an interior portion of a motor vehicle containing an inflation assembly, in accordance with one embodiment of the invention, in a static state.
Figure 3:
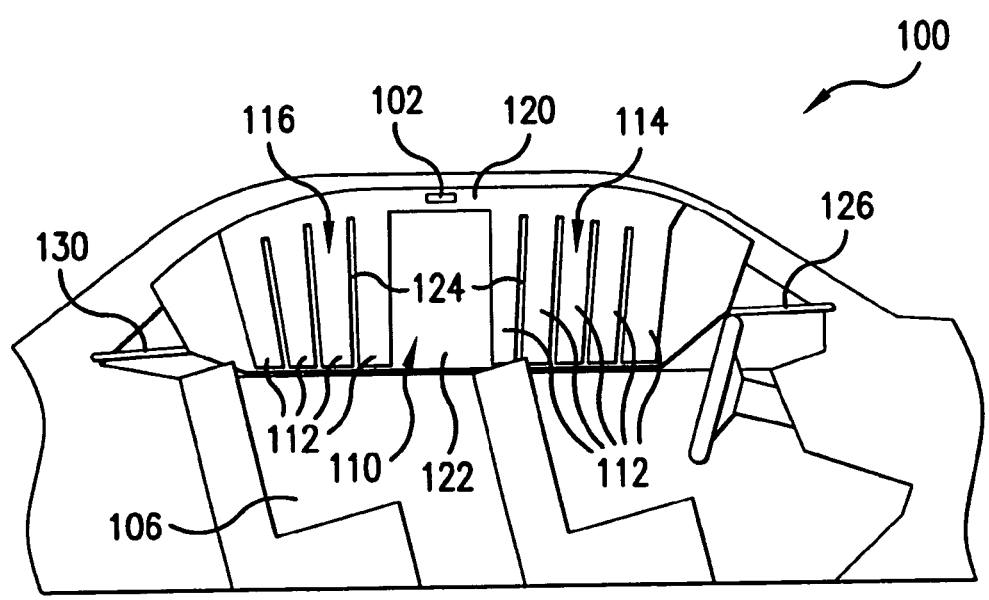
FIG. 3 is a simplified fragmentary schematic of an interior portion of a motor vehicle generally corresponding to FIG. 2 and containing an inflation assembly, in accordance with one embodiment of the invention, but now shown in an activated state.

Turning now to FIGS. 2 and 3, there is illustrated a simplified fragmentary schematic of an interior portion of a motor vehicle 100 which contains an inflation assembly 102 in accordance with the invention and similar to the assembly 10 described above. In the static state shown in FIG. 2, the inflation assembly 102 is generally disposed along the roof line 104 at or adjacent the vehicle door side 106. In FIG. 3, the inflation assembly 102 is shown in an activated state.

The inflation assembly 102 has associated therewith an inflatable restraint device 110 in the general form or configuration of an inflatable curtain airbag cushion, in accordance with one preferred embodiment of the invention.

While inflatable curtain airbag cushions for use in the practice of the invention can be variously constructed or fabricated, the invention is believed to have particular perceived utility in conjunction with inflatable curtain airbag cushions such as of the type identified above and described in the above-referenced HÅland et al., U.S. Pat. No. 5,788, 270. In accordance therewith, the inflatable curtain inflatable device 110 incorporates a plurality of parallel substantially vertical, substantially cylindrical cells 112 forming a front seat-adjacent inflatable section 114 and a rear seat-adjacent inflatable section 116 joined together by a connecting inflatable section 120, such as to better equalize the inflation forces in the front and rear section 114 and 116, and a connecting uninflatable section 122. The inflatable device 110 may be made of interwoven fabric. Such a fabric comprises a first layer that defines the front part or region of the inflatable device 110 (e.g., the part of the inflatable device 110 that is visible in FIG. 3) and a second layer that defines the back part or region of the inflatable device 110 (e.g., the part of the inflatable device 110 that is adjacent the vehicle door side 106 in FIG. 3). Selected areas of the first and second regions in turn are interwoven to define links in the form of points or lines 124 where the front part and the back part of the inflatable element are secured together. A technique for making an inflatable element of interwoven fabric is described in more detail in International Patent Publication WO 90/09295.

The inflatable device 110 also includes a first or forward webbing strap 126 and a second or rearward webbing strap 130 such as permits the inflatable device 110 to desirably extend across the vehicle side 106 when in an activated inflated state, as shown in FIG. 3 and such as may desired to provide desired occupant protection.

Figure 4:
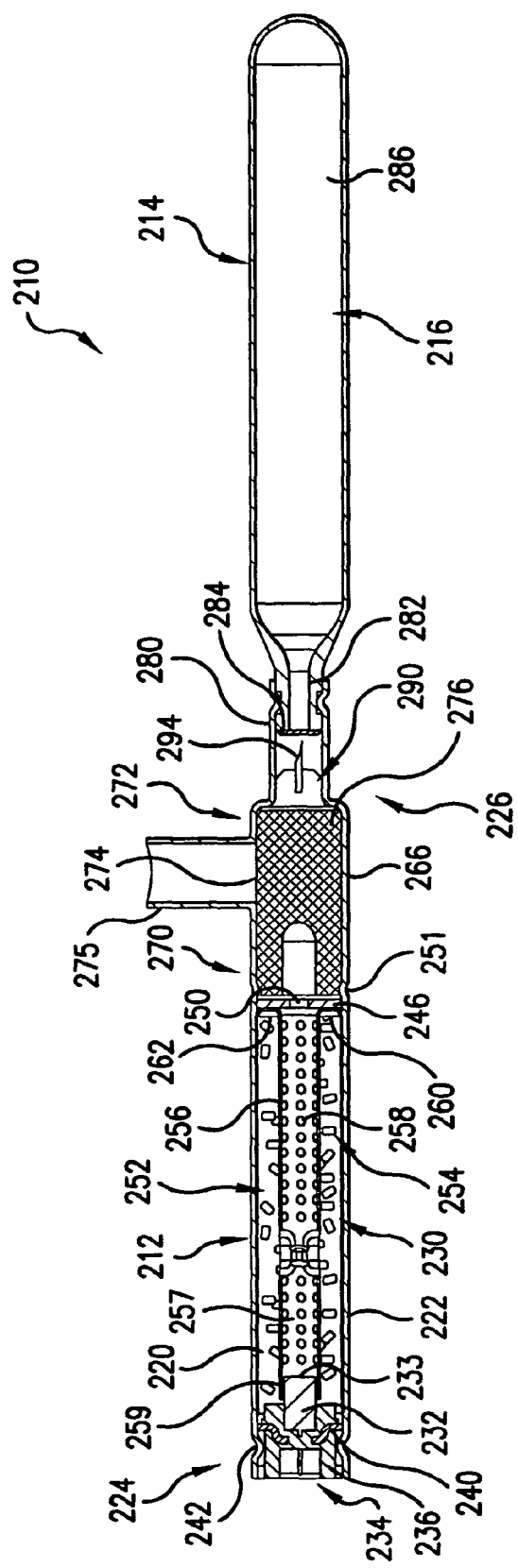
FIG. 4 is a simplified side view, partially in section, of an inflation assembly in accordance with another preferred embodiment of the invention.

Turning now to FIG. 4, there is illustrated an inflation assembly 210 in accordance with another preferred embodiment of the invention.

The inflation assembly 210 is shown in a static state and is generally similar to the inflation assembly 10, described above. The inflation assembly 210 generally includes an elongated hollow tubular member 212 to which is joined or connected a gas bottle 214 or the like such as forming a supplemental gas supply chamber 216. The tubular member 212 has an inner and an outer surface, 220 and 222, respectively, and forms generally opposed first and second ends, 224 and 226, respectively. The tubular member 212, at least in part, forms or includes a chamber or inflator device 230, sometimes hereinafter referred to as a "first chamber" or a "hot gas-producing chamber". The tubular member 212 also houses or contains an initiator 232, such as described above and effective ignite a supply of associated gas generant material. The initiator has or includes a discharge end 233.

As shown, the initiator 232 may form a part of an initiator assembly 234 that also includes an adapter 236 and a base plate 240. The initiator 232, such as as a part of the initiator assembly 234, may be suitably secured at a desired location within the tubular member 212 such as described above, such as by means of a first orbital crimp 242 imposed in or on the tubular member 212 near or at the first end 224.

The tubular member 212 also houses or contains an orifice plate 246, such as having an orifice 250 passing therethrough. The orifice plate 246 is suitably secured at a desired location within the tubular member 212, such as by means of a second orbital crimp 251 imposed in or on the tubular member 212.

The initiator assembly 234 and the orifice plate 246 are spaced apart to form a storage volume 252 therebetween and in which storage volume is contained a supply of pyrotechnic gas generant material, generally designated by the reference numeral 254 and such as described above, reactable to produce a supply of gas such as may be used in the inflation of an associated inflatable device (not here shown).

Within the storage volume 252 there is disposed, preferably centrally disposed, a baffle 256. The supply of pyrotechnic gas generant material 254 is disposed within the storage volume 252 between the baffle 256 and the tubular housing inner surface 220. The baffle 256 includes a central passageway 257 and also a plurality of orifices 258. The baffle 256 has a first end 259 disposed adjacent the initiator discharge end 233 such that the baffle central passageway 257 is generally aligned with the initiator discharge end 233 such that actuation of the initiator 232 results in the communication of reaction initiating products through the central passageway 257 and discharge thereof through the orifices 258 and into reaction initiating communication with the supply of pyrotechnic gas generant material 254. The baffle 256 also has a second end 260 including a flange 262 adjacent the orifice plate 246.

The inflation assembly 210, similar to the inflation assembly 10 described above, also includes a diffuser chamber 266 having a first end 270 and a second end 272 and forms or includes an exit opening 274, formed in or through the tubular member 212, and such as at least in part effective to discharge gas into an associated inflatable restraint device, such as through a nipple assembly 275 disposed at or adjacent the exit opening 274. The diffuser chamber 266 includes or generally contains a gas treatment element 276 such as described above.

As identified above, the inflation assembly 210 also includes a supplemental gas supply chamber 216 such as generally formed by the closed-end gas storage bottle 214. Such a supplemental gas supply chamber is sometimes hereinafter referred to as a "second chamber" or a "cold gas-supplying chamber". The gas storage bottle 214 is joined or otherwise desirably connected with the tubular member second end 226 in an appropriate manner such as via a connector such as described above and here designated by the reference numeral 280. As will be appreciated by those skilled in the art and guided by the teachings herein provided, the connector 280 may, as shown, be formed continuous and in or as one piece with the tubular member 212 or as a separate assembly component similar to the connector 80 shown in FIG. 1.

The gas storage bottle 214 has a necked-down opening 282 for permitting passage in and out of the supplemental gas supply chamber 216. In a static state, the supplemental gas supply chamber 216 is closed such as by means of a burst disc 284 disposed at or adjacent necked-down bottle opening 282. In such static state, the supplemental gas supply chamber 216 has contents, designated by the reference numeral 286, including a supply of at least one gas source material compressed therewithin, such as described above.

The inflation assembly 210 includes a chamber opener assembly 290 such as disposed within the tubular connector 280 and actuatable to effect opening of the supplemental gas supply chamber 216 such that at least a portion of the supplemental gas supply chamber contents 286 are in gas flow communication through the bottle opening 282 and the tubular member second end 226 with the diffuser chamber 266 and the at least one gas treatment element 276 disposed therewithin. More specifically, the chamber opener assembly 290 of the illustrated embodiment, includes a projectile 294. Upon actuation of the chamber opener assembly 290, the projectile 294 is effective to rupture or otherwise open the burst disc 284 such as to permit passage of at least a portion of the supplemental gas supply chamber contents 286 through the bottle opening 282 and out from the supplemental gas supply chamber 216. More specifically, the reaction products formed by the reaction of the pyrotechnic gas generant material 254 serve to at least in part propel the projectile 294 into the rupturable seal, e.g., the disc 284, to effect the rupture thereof.

As will be appreciated by those skilled in the art and guided by the teachings herein provided, operation of the inflation assembly 210 is generally similar to that of the inflation assembly 10 described above.

While the invention has been described above making specific reference to embodiments wherein the first chamber (i.e., the hot gas-producing chamber), the diffuser chamber and the second chamber (i.e., the cold gas-supplying chamber) are longitudinally aligned, the broader practice of the invention is not necessarily so limited.

Figure 5:
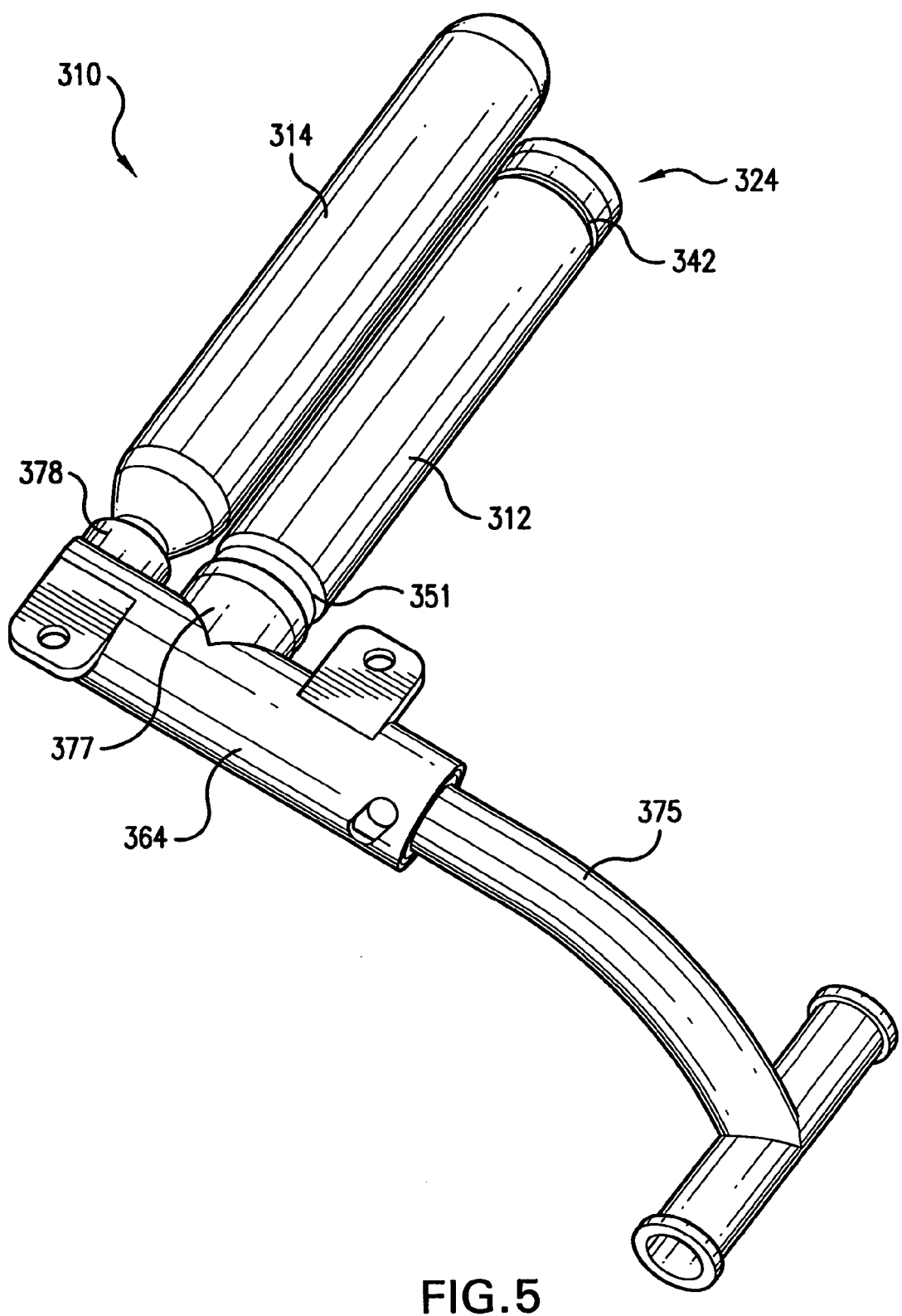
FIG. 5 is a simplified isometric view of an inflation assembly in accordance with yet another preferred embodiment of the invention.
Figure 6:
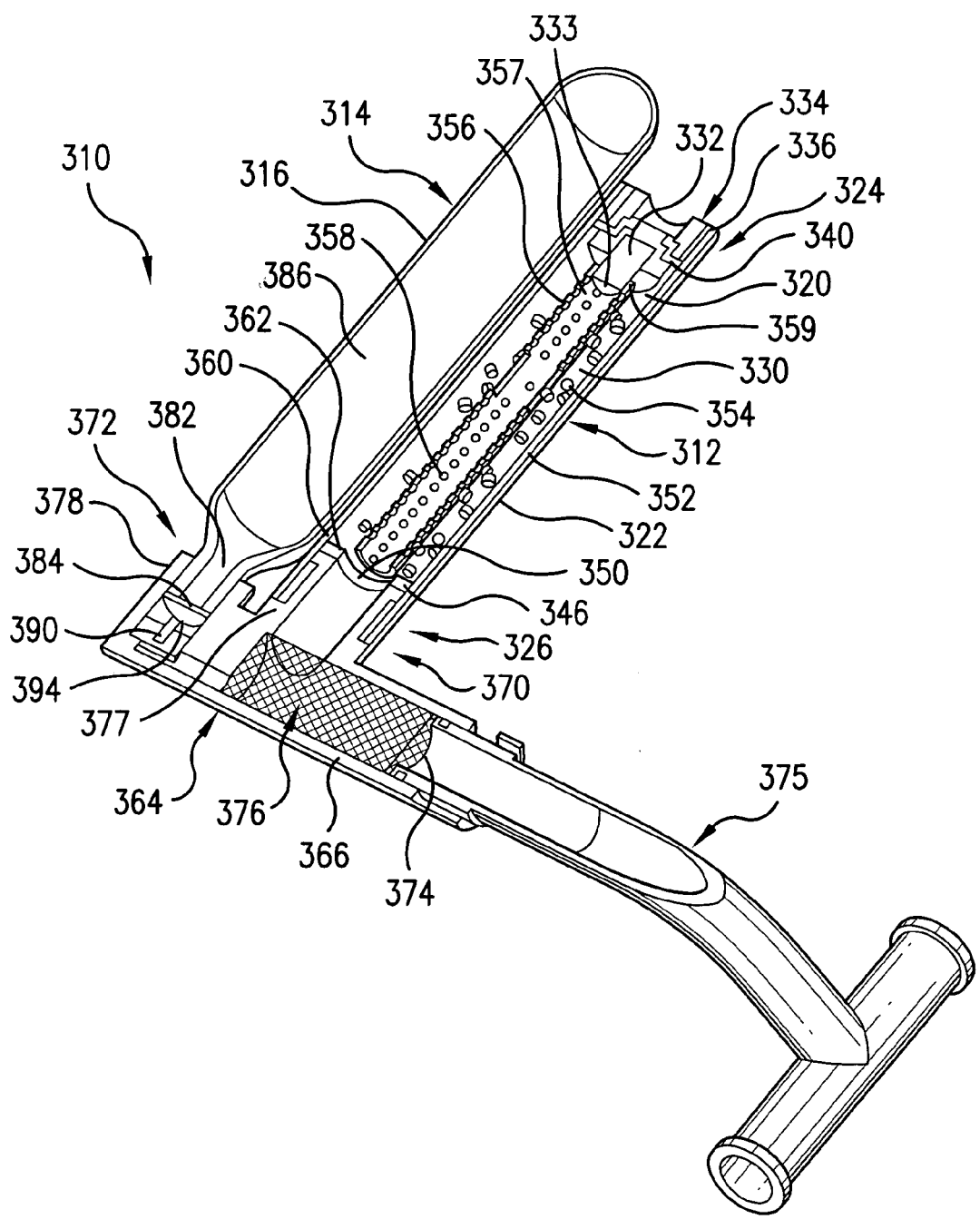
FIG. 6 is a simplified, partially in section view of the inflation assembly shown in FIG. 5.

Turning to FIGS. 5 and 6, there is illustrated the present invention as embodied in an inflation assembly, generally designated by the reference numeral 310. In the inflation assembly 310, at least the hot gas-producing chamber and the cold gas-supplying chamber are adjacently disposed side-by-side.

The inflation assembly 310 is shown in a static state and is in many respects similar to the inflation assembly 210, described above. The inflation assembly 310 generally includes an elongated hollow tubylar member 312 as well as a gas bottle 314 or the like such as forming a supplemental gas supply chamber 316. The tubular member 312 has an inner and an outer surface, 320 and 322, respectively, and forms generally opposed first and second ends, 324 and 326, respectively. The tubular member 312, at least in part, forms or includes a chamber or inflator device 330. The chamber 330 is sometimes hereinafter referred to as a "first chamber" or a "hot gas-producing chamber" and the supplemental gas supply chamber 316 is sometimes hereinafter referred to as a "second chamber" or a "cold gas-supplying chamber". The tubular member 312 also houses or contains an initiator 332, such as described above. The initiator is effective to ignite a supply of associated gas generant material. The initiator has or includes a discharge end 333.

As shown, the initiator 332 may form a part of an initiator assembly 334 that also includes an adapter 336 and a base plate 340. The initiator 332, such as as a part of the initiator assembly 334, may be suitably secured at a desired location within the tubular member 312 such as described above, such as by means of a first orbital crimp 342 imposed in or on the tubular member 312 near or at the first end 324.

The tubular member 312 also houses or contains an orifice plate 346, such as having an orifice 350 passing therethrough. The orifice plate 46 is suitably secured at a desired location within the tubular member 312, such as by means of a second orbital crimp 351 imposed in or on the tubular member 312.

The initiator assembly 334 and the orifice plate 346 are spaced apart to form a storage volume 352 therebetween and in which storage volume is contained a supply of pyrotechnic gas generant material, generally designated by the reference numeral 354 and such as described above, reactable to produce a supply of gas such as may be used in the inflation of an associated inflatable device (not here shown).

Within the storage volume 352 there is disposed, preferably centrally disposed, a baffle 356 such as generally similar to the baffle 256 described above. The supply of pyrotechnic gas generant material 354 is disposed within the storage volume 352 between the baffle 356 and the tubular housing inner surface 320. The baffle 356 includes a central passageway 357 and also a plurality of orifices 358. The baffle 356 has a first end 359 disposed adjacent the initiator discharge end 333 such that the baffle central passageway 357 is generally aligned with the initiator discharge end 333 such that actuation of the initiator 332 results in the communication of reaction initiating products through the central passageway 357 and discharge thereof through the orifices 358 and into reaction initiating communication with the supply of pyrotechnic gas generant material 354. The baffle 356 also has a second end 360 including a flange 362 adjacent the orifice plate 346.

The inflation assembly 310 also includes a distribution block 364 which forms a diffuser chamber 366 having a first end 370 and a second end 372 and forms or includes an exit opening 374 at least in part effective to discharge gas into an associated inflatable restraint device, such as distribution conduit 375 joined or otherwise connected to the exit opening 374. The diffuser chamber 366 includes or generally contains a gas treatment element 376 such as described above.

The tubular member 312, such as forming the hot gas-producing chamber 330, and the gas storage bottle 314, such as forming the cold gas-supplying chamber 316, are suitably joined or otherwise connected to the diffuser chamber 366 such as via the connection port collars 377 and 378, respectively, such that the hot gas-producing chamber 330 and the cold gas-supplying chamber 316 are adjacently disposed side-by-side.

The gas storage bottle 314 has a necked-down opening 382 for permitting passage in and out of the supplemental gas supply chamber 316. In a static state, the supplemental gas supply chamber 316 is closed such as by means of a burst disc 384 disposed at or adjacent necked-down bottle opening 382. In such static state, the supplemental gas supply chamber 316 has contents, designated by the reference numeral 386, including a supply of at least one gas source material compressed therewithin, such as described above.

The inflation assembly 310 also includes a chamber opener assembly 390 such as disposed within the diffuser chamber 366 and actuatable to effect opening of the supplemental gas supply chamber 316 such that at least a portion of the supplemental gas supply chamber contents 386 are in gas flow communication through the bottle opening 382 and the diffuser chamber 366 and the at least one gas treatment element 376 disposed therewithin. More specifically, the chamber opener assembly 390 of the illustrated embodiment, includes a projectile 394. Upon actuation of the chamber opener assembly 390, the projectile 394 is effective to rupture or otherwise open the burst disc 384 such as to permit passage of at least a portion of the supplemental gas supply chamber contents 386 through the bottle opening 382 and out from the supplemental gas supply chamber 316.

As will be appreciated by those skilled in the art and guided by the teachings herein provided, operation of the inflation assembly 310 is generally similar to that of the inflation assembly 210 described above. It is noted, however, that the side-by-side placement of the hot gas-producing chamber 330 and the cold gas-supplying chamber 316 in the inflation assembly 310 can advantageously result in improved or increased use of the gas treatment element 376 disposed within the diffuser chamber 366. More specifically, in the embodiment shown in FIGS. 5 and 6, both the hot gas produced or supplied from the hot gas-producing chamber 330 and the cold gas produced or supplied from the cold gas-supplying chamber 316 flow or pass through the gas treatment element 376 in the same general direction and for the same general length. This is in contrast to the inflation assemblies 210 and 10 described above wherein the gas flows from the first and second chamber were in generally opposite directions and wherein neither of such flows made effective use of the entire length of the respective gas treatment element.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

EXAMPLES

Comparative Example 1 and Examples 1–4

In these tests, a test inflator similar in construction to the inflation assembly 10 shown in FIG. 1 was used to evaluate the performance of inflators in accordance with the invention.

In each of the tests, the test inflator contained the same amount (17.4 grams) of the same pyrotechnic gas generant material composition in the hot gas-producing chamber, but the gas treatment element (e.g., the amount of cooling screen material, as measured in terms of weight); the amount of supplemental gas supply (in terms of gas weight) in the cold gas-supplying chamber; and the length of the inflator (e.g., to account for the amount of cooling screen material and the amount of supplemental gas supply) were varied. The stored gas, employed in any of the tests, was of the same composition. The specific values of these parameters for each of these tests are shown in TABLE 1, below.

More specifically, in Examples 1–4 the quantity or amount of supplemental gas supply as well as the amount of the gas treatment element were evaluated and compared relative to a test inflator that was without a supplemental gas supply (Comparative Example 1). The results for each of the tests, in terms of in-position time and cushion inflation pressure (both maximum and at time intervals of 5 msec and 5 seconds after actuation) are shown in TABLE 2, below. Also shown in TABLE 2 are the targeted design values for each of these performance parameters.

TABLE 1

| TEST | Cooling Screen weight (g) | Stored Gas weight (g) | Inflator Length (mm) |
| --- | --- | --- | --- |
| Comparative Example 1 | 23.5 | -0- | 110 |
| Example 1 | 23.5 | 12.2 | 235 |
| Example 2 | 23.5 | 14.7 | 255 |
| Example 3 | 37 | 14.7 | 280 |
| Example 4 | 30 | 12.2 | 245 |

TABLE 2

| Parameter | In Position Time (msec) | 30 msec pressure (kPa) | Maximum Pressure (kPa) | 5 second pressure (kPa) |
| --- | --- | --- | --- | --- |
| Target | <20 | >80 | <125 | >25 |
| Comparative Example 1 | 16 | 88 | 115 | 0 |
| Example 1 | 16 | 88 | 115 | 16 |
| Example 2 | 16 | 88 | 115 | 36 |
| Example 3 | 22 | 63 | 93 | 55 |
| Example 4 | 19 | 81 | 105 | 34 |

Discussion of Results

The results shown in TABLE 2 show the relationship of filter/cooling pack weight and gas weight to fill pressure. Notice that with test inflators employing a higher weight of the cooling screen, the initial bag fill (i.e., the 30 msec pressure) was reduced (attributable to cooler gas), however, the final bag fill (i.e., the 5 second pressure) was increased (attributable to an increased amount of residual heat being transferred from the cooling screen to the supplemental gas).

The test inflator employed in Example 4 appears to have satisfied all the targeted design values for each of these performance parameters in the smallest package size.

Thus, the invention desirably provides effective and efficient inflation assemblies particularly suited to provide or result in an extended stand-up time of an associated airbag cushion, as required or desired for certain inflatable restraint installations. In particular, the invention provides inflator devices for such applications which are desirably smaller and lighter in weight than cold gas inflators which provide the same volume of gas. Thus, the invention generally provides inflator devices which are pyrotechnic-based or have principles of operation based on pyrotechnic inflators which area well suited for use in association with side impact inflatable restraints, such as inflatable curtain type occupant restraints. That is, the invention generally provides pyrotechnic-based inflator devices which provide or result in an extended stand-up time of an associated inflatable device in a manner which is either or both more efficient and effective than otherwise previously available. Moreover, the invention generally provides such a pyrotechnic-based inflation assembly effective for supplying a quantity of inflation gas to at least one associated inflatable restraint device in a manner effective to minimize, reduce or eliminate issues relating to heat soak to a greater extent than otherwise previously available.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflation assembly effective for supplying a quantity of inflation gas to at least one associated inflatable restraint device, the inflation assembly comprising:
    a first chamber containing supply of a first reactant material effective, upon reaction, to produce first reaction products at least including a quantity of gas and a quantity of heat;
    a first initiator in reaction initiating discharge communication with at least a portion of the supply of the first reactant material contained within the first chamber, the first initiator effective upon actuation to initiate reaction of at least a portion of the supply of the first reactant material contained within the first chamber,
    a diffuser chamber having a first end and a second end, the diffuser chamber in gas flow communication through the first end with the first chamber upon actuation of the first initiator, the diffuser chamber effective to discharge gas into the at least one associated inflatable restraint device,
    at least one gas treatment element at least in part disposed within the diffuser chamber, the at least one gas treatment element effective for treating gas being discharged into the at least one associated inflatable restraint device,
    a second chamber having contents including a supply of dissociative gas source material comprising nitrous oxide, the second chamber closed in a static state with the nitrous oxide compressed therewithin, the second chamber openable upon actuation thereof whereby at least a portion of the second chamber contents including at least a portion of the nitrous oxide are in gas flow communication through the second end with the diffuser chamber and the at least one gas treatment element disposed therewithin, and
    a chamber opener effective upon actuation of the inflation assembly to open the second chamber and to release at least a portion of the second chamber contents including at least a portion of the nitrous oxide into gas flow communication with the diffuser chamber and the at least one gas treatment element disposed therewithin, the chamber opener including a throttling orifice formed therein, wherein the at least a portion of the second chamber contents enter the diffuser chamber through the throttling orifice.

2. The inflation assembly of claim 1 wherein the first reactant material is a pyrotechnic material.

3. The inflation assembly of claim 1 wherein the second chamber additionally comprises at least one inert gas.

4. The inflation assembly of claim 1 wherein the at least one gas treatment element comprises a filter.

5. The inflation assembly of claim 1 wherein the chamber opener comprises a projectile.

6. The inflation assembly of claim 5 wherein the second chamber includes an opening closed in a static state by a rupturable seal and wherein the first reaction products at least in part propel the projectile into the rupturable seal to effect the rupture thereof.

7. A combination comprising the inflation assembly of claim 1 and at least one associated inflatable restraint device, wherein the at least one associated inflatable restraint device comprises an inflatable curtain restraint device.

8. The inflation assembly of claim 1 wherein the at least one gas treatment element is heated by contact with the first reaction products and wherein the portion of the second chamber contents released into gas flow communication with the diffuser chamber and the at least one gas treatment element contact the heated treatment element.

9. The inflation assembly of claim 8 wherein the nitrous oxide has a first molar content and wherein at least a portion of the nitrous oxide contacting the heated treatment element dissociates to form dissociation products having a second molar content, where the second molar content is greater than the first molar content.

10. The inflation assembly of claim 1 wherein the first chamber, the diffuser chamber and the second chamber are longitudinally aligned.

11. The inflation assembly of claim 1 wherein the first chamber and the second chamber are adjacently disposed side-by-side.

12. An inflation assembly effective for supplying a quantity of inflation gas to at least one associated inflatable restraint device, the inflation assembly comprising:
    a first chamber containing supply of a first reactant material effective, upon reaction, to produce first reaction products at least including a quantity of gas and a quantity of heat;
    a first initiator in reaction initiating discharge communication with at least a portion of the supply of the first reactant material contained within the first chamber, the first initiator effective upon actuation to initiate reaction of at least a portion of the supply of the first reactant material contained within the first chamber, a diffuser chamber having a first end and a second end, the diffuser chamber in gas flow communication through the first end with the first chamber upon actuation of the first initiator, the diffuser chamber effective to discharge gas into the at least one associated inflatable restraint device, at least one gas treatment element at least in part disposed within the diffuser chamber, the at least one gas treatment element comprising a filter composed of a woven metal and effective for treating gas being discharged into the at least one associated inflatable restraint device, a second chamber having contents including a supply of at least one gas source material, the second chamber closed in a static state with the supply of the at least one gas source material compressed therewithin, the second chamber openable upon actuation thereof whereby at least a portion of the second chamber contents are in gas flow communication through the second end with the diffuser chamber and the at least one gas treatment element disposed therewithin, and a chamber opener effective upon actuation of the inflation assembly to open the second chamber and to release at least a portion of the second chamber contents into gas flow communication with the diffuser chamber and the at least one gas treatment element disposed therewithin;

wherein the at least one gas treatment element is heated by contact with the first reaction products and wherein the portion of the second chamber contents released into gas flow communication with the diffuser chamber and the at least one gas treatment element contact the heated treatment element and is heated thereby.

13. The inflation assembly of claim 2 wherein the first reactant material is a pyrotechnic material.

14. The inflation assembly of claim 2 wherein the at least one gas source material comprises at least one inert gas.

15. The inflation assembly of claim 2 wherein the at least one gas source material comprises nitrous oxide.

16. The inflation assembly of claim 2 wherein the at least one gas source material comprises nitrous oxide and at least one inert gas.

17. The inflation assembly of claim 2 wherein the chamber opener comprises a projectile.

18. The inflation assembly of claim 17 wherein the second chamber includes an opening closed in a static state by a rupturable seal and wherein the first reaction products at least in part propel the projectile into the rupturable seal to effect the rupture thereof.

19. A combination comprising the inflation assembly of claim 12 and at least one associated inflatable restraint device, wherein the at least one associated inflatable restraint device comprises an inflatable curtain restraint device.

20. The inflation assembly of claim 12 wherein the at least one gas source material has a first molar content and comprises nitrous oxide and wherein at least a portion of the nitrous oxide contacting the heated treatment element dissociates to form dissociation products having a second molar content, where the second molar content is greater than the first molar content.

21. The inflation assembly of claim 12 wherein the first chamber and the second chamber are adjacently disposed side-by-side.

22. An assembly for supplying inflation gas to an inflatable restraint device, the assembly comprising:

a diffuser chamber having at least one discharge opening effective to discharge gas into the inflatable restraint device, the diffuser chamber having first and second ends with a pyrotechnic inflator device disposed at the first end and a stored gas chamber disposed at the second end, the pyrotechnic inflator device including a first chamber containing supply of at least one pyrotechnic gas generant material effective, upon reaction, to produce first reaction products at least including a quantity of gas and a quantity of heat, the pyrotechnic inflator device also including an initiator in reaction initiating discharge communication with at least a portion of the supply of the at least one pyrotechnic gas generant material contained within the first chamber, the first initiator effective upon actuation to initiate reaction of at least a portion of the supply of the at least one pyrotechnic gas generant material contained within the first chamber, the stored gas chamber, in a static state, having contents including a supply of at least one stored compressed gas, at least one gas treatment element in spaced relation with the stored gas chamber and at least in part disposed within the diffuser chamber, the at least one gas treatment element effective for treating gas being discharged into the inflatable restraint device, and a chamber opener at least in part disposed between the at least one gas treatment element and the stored gas chamber, wherein upon actuation of the inflation assembly, at least a portion of the first reaction products pass through the gas treatment element to contact and move the chamber opener to open the second chamber and to release at least a portion of the stored gas chamber contents into gas flow communication with the diffuser chamber and the at least one gas treatment element disposed therewithin.

23. The assembly of claim 22 wherein the at least one gas source material comprises at least one inert gas.

24. The assembly of claim 22 wherein the at least one gas source material comprises nitrous oxide.

25. The assembly of claim 22 wherein the at least one gas source material comprises nitrous oxide and at least one inert gas.

26. A combination comprising the assembly of claim 22 and at least one associated inflatable restraint device, wherein the at least one associated inflatable restraint device comprises an inflatable curtain restraint device.

27. The assembly of claim 22 wherein the at least one gas treatment element is heated by contact with the first reaction products and wherein the portion of the second chamber contents released into gas flow communication with the diffuser chamber and the at least one gas treatment element contact the heated treatment element.

28. The assembly of claim 27 wherein the at least one gas source material has a first molar content and comprises nitrous oxide and wherein at least a portion of the nitrous oxide contacting the heated treatment element dissociates to form dissociation products having a second molar content, where the second molar content is greater than the first molar content.

29. The assembly of claim 22 wherein the first chamber, the diffuser chamber and the second chamber are longitudinally aligned.

30. The assembly of claim 22 wherein the first chamber and the second chamber are adjacently disposed side-by-side.

* * * * *